United States Patent [19]
Mueller et al.

[11] 3,714,285
[45] Jan. 30, 1973

[54] MANUFACTURE OF ISOPRENE

[75] Inventors: Herbert Mueller, Frankenthal; Wolfgang Koernig, Heidelberg; Harald Koehl, Bobenheim-Roxheim, all of Germany

[73] Assignee: Badische Anilin- & Soda-Fabrik Aktiengesellschaft, Ludwigshafen/Rhine, Germany

[22] Filed: June 21, 1971

[21] Appl. No.: 155,242

[30] Foreign Application Priority Data

June 27, 1970 Germany......................P 20 31 900.0

[52] U.S. Cl..............................................260/681
[51] Int. Cl..................................................C07c 1/24
[58] Field of Search......................................260/681

[56] References Cited

UNITED STATES PATENTS

| 1,923,569 | 8/1933 | Mueller-Cunradi et al. | 260/681 |
| 3,574,773 | 4/1971 | Mueller et al. | 260/681 |
| 3,657,376 | 4/1972 | Stuebinger et al. | 260/681 |

FOREIGN PATENTS OR APPLICATIONS

| 345,270 | 3/1931 | Great Britain | 260/681 |

*Primary Examiner*—Paul M. Coughlan, Jr.
*Attorney*—Johnston, Root, O'Keefe, Keil, Thompson & Shurtleff

[57] ABSTRACT

Manufacture of isoprene by catalytic dehydration of 3-methyl-3-buten-1-ol in the presence of inorganic acids as catalysts at elevated temperatures, wherein 3-methyl-3-buten-1-ol is passed over a pumice-supported phosphoric acid catalyst.

3 Claims, No Drawings

MANUFACTURE OF ISOPRENE

The present invention relates to a process for the manufacture of isoprene by catalytic dehydration of 3-methyl-3-buten-1-ol.

A number of processes for the manufacture of isoprene have already been described. Thus it is known for example to prepare isoprene by the dehydrogenation of $C_5$ hydrocarbon mixtures. It is also known to manufacture isoprene by dimerizing propylene followed by removal of methane from the intermediate. Another method is to react isobutylene with formaldehyde to form 4,4-dimethyl-1,3-dioxane and then to split the latter catalytically to give isoprene. Yet another method of preparing isoprene comprises the dehydration of 2-methyl-3-buten-2-ol, which may be obtained by reacting acetone with acetylene. However, the above processes suffer from the drawback that the preparation of the starting materials used therein is not sufficiently economical and/or the conversion to isoprene is not adequately selective and provides unsatisfactory yields.

It is an object of the invention to provide a process for the manufacture of isoprene by dehydration of 3-methyl-3-buten-1-ol, in which conversion to isoprene may be effected more selectively and in better yields than in conventional processes.

It is another object of the invention to provide a process employing starting materials which may be obtained in an economical manner.

In accordance with the present invention these and other objects and advantages are achieved in a process for the manufacture of isoprene by catalytic dehydration of 3-methyl-3-buten-1-ol in the presence of inorganic acids as catalysts and at elevated temperatures, in which 3-methyl-3-buten-1-ol is passed over a supported phosphoric acid catalyst in which pumice is the support.

According to the new process, isoprene is obtained in excellent yield and purity from a starting material which may be prepared in a simple and economical manner by reacting isobutylene with formaldehyde (cf. German Published application DAS 1,275,049).

It is surprising that the present process produces isoprene in excellent yields, since the Journal of Organic Chemistry USSR, Vol. 3 (1967) p. 1328 states that 3-methyl-3-buten-1-ol is neither dehydrated nor isomerized by the action of dilute sulfuric acid.

Dehydration is conveniently effected using a starting material which is at least 85 percent pure and preferably at least 90 percent w/w pure. Usually commercial 3-methyl-3-buten-1-ol is used, this generally having a purity of about 85 to 99 percent by weight. Surprisingly, particularly high yields are obtained when the starting material is reacted in admixture with steam. The amount of steam used is generally from 10 to 50 percent and preferably from 10 to 30 percent by volume, based on the gaseous reactant. Due to the beneficial effect of steam, it is possible to effect dehydration using moist 3-methyl-3-buten-1-ol as obtained in the commercial preparation of the methylbutenol from isobutylene and formaldehyde before purification by distillation. If use is made of moist starting material, this contains a quantity of water which is generally not more than that dissolved therein at approximately room temperature at saturation. Good results are also obtained when the starting material is dehydrated in the presence of inert gases such as nitrogen or argon. The inert gases are generally used in quantities ranging from 10 to 40 percent and preferably from 10 to 30 percent by volume, based on the gaseous mixture of starting material and inert gas. Dehydration may be effected with the inert gases in addition to or in place of steam.

The catalytic dehydration is carried out using a supported phosphoric acid catalyst in which pumice is the support. In general, the catalyst contains from 5 to 30 percent and preferably from 5 to 20 percent by weight of phosphoric acid, based on the total catalyst. The catalyst may be used in powder form and/or in a coarser form, for example in the form of particles having a diameter of, say, from 2 to 8 mm. The catalyst is prepared by known techniques, for example by placing pumice of suitable particle size in a rotary drum and spraying it with an appropriate amount of phosphoric acid, for example 5 to 40 percent w/w phosphoric acid, at 150°C.

When dehydration of 3-methyl-3-buten-1-ol is carried out with the supported catalyst in a fixed bed, the catalyst is preferably in a coarser form, for example in the form of particles having a diameter of from 3 to 6 mm. In a preferred embodiment of the process, dehydration is carried out in a fluidized bed, in which case the supported catalyst is preferably in the form of a powder.

Dehydration is generally carried out at temperatures ranging from 100° to 250°C and preferably from 130° to 200°C. The pressure used may vary within wide limits. In general, the process is carried out at atmospheric or slightly reduced pressure. However, it is also possible to carry out the reaction at superatmospheric pressure, for example 5 atmospheres, or a strongly reduced pressure, for example 100 mm of Hg.

The dehydration process may be carried out batchwise, although the process is advantageously carried out continuously. For example, dehydration is effected by passing gaseous 3-methyl-3-buten-1-ol, optionally in admixture with steam and/or inert gas, through a tubular reactor containing the catalyst proposed in accordance with the present invention and heated at the reaction temperature. The residence time may be varied within wide limits, usually from 0.01 to 10 seconds. In continuous operation, the catalyst may be used for a virtually unlimited period without replacement if fresh phosphoric acid, for example 5 to 40 percent w/w phosphoric acid, is fed to the reactor during the reaction to replace the phosphoric acid lost by evaporation.

Working up may be carried out, for example, by condensing the gas mixture leaving the reactor and separating the resulting condensate, for example by fractional distillation. Any unreacted methylbutenol is conveniently recycled to the reaction. Generally, however, conversions of more than 98 percent are achieved in a simple pass, in which case the separation of unreacted methylbutenol may be dispensed with.

The catalyst to be used in the process of the invention is notable for its long life. When its activity falls, the catalyst may be roasted in air at 500°C, whereupon phosphoric acid may be re-applied thereto, by which means it is reactivated to its initial efficiency.

Isoprene is an important monomer for the manufacture of valuable polymers such as synthetic rubber, and is also a valuable intermediate in, say, the preparation of terpenes.

In the following Examples the parts by weight relate to the parts by volume as do kilograms to liters.

EXAMPLE 1

A vertical tube having a capacity of 1 part by volume and an $l/d$ ration of 10 : 1 is packed with pumice particles having a diameter of from 3 to 6 mm and impregnated with 15% by weight of phosphoric acid. Through this tube there are passed, at 150°C, 0.85 part by weight of gaseous 3-methyl-3-buten-1-ol in admixture with 250 parts by volume of nitrogen as inert gas, the residence time being 5 seconds. The gas mixture leaving the reaction tube is condensed and then fractionally distilled. After a single pass, isoprene is obtained in a yield of more than 95 percent of theory.

The catalyst used in this Example was prepared in a rotary drum by spraying pumice with 20 percent w/w phosphoric acid at 150°C.

Using superheated steam at 150°C in place of nitrogen, all other conditions being equal, isoprene is obtained in a yield of 95 percent of theory.

EXAMPLE 2

Through a cylindrical stirred fluidized bed having a capacity of 1 part volume and a length-to-diameter ratio of 1 : 1 and containing pumice particles having a diameter of from 0.1 to 0.3 mm and impregnated with 7.5 percent by weight of phosphoric acid there are passed, at 200°C, 0.85 part by weight of gaseous 3-methyl-3-buten-1-ol in admixture with 120 parts by volume of nitrogen as inert gas, the residence time being 1 second. The resulting isoprene is worked up in the manner described in Example 1. The yield of isoprene is 94 percent of theory.

In continuous operation, the catalyst may be used for a virtually unlimited period without replacement if fresh phosphoric acid, for example 10 percent w/w phosphoric acid, is metered to the fluidized bed during the reaction to replace the phosphoric acid lost by evaporation.

We claim:

1. A process for the manufacture of isoprene by catalytic dehydration of 3-methyl-3-buten-1-ol which comprises passing 3-methyl-3-buten-1-ol at elevated temperatures over a supported phosphoric acid catalyst in which pumice is the support.

2. A process as claimed in claim 1, wherein dehydration is carried out in the presence of steam and/or an inert gas.

3. A process as claimed in claim 1, wherein dehydration is carried out in a fluidized bed.

* * * * *